United States Patent [19]

Ruiz

[11] Patent Number: 5,022,550
[45] Date of Patent: Jun. 11, 1991

[54] COOKING UTENSIL WITH NESTED LID

[76] Inventor: Peter R. Ruiz, 9231 S. Winchester Ave., Chicago, Ill. 60620

[21] Appl. No.: 519,772

[22] Filed: May 7, 1990

[51] Int. Cl.⁵ .............................................. B65D 25/28
[52] U.S. Cl. ............................. 220/94 R; 220/85 CH; 206/514; 248/213.2; 248/318
[58] Field of Search ............. 220/94 A, 94 R, 85 CH, 220/18; 248/318, 690, 213.2; 206/501, 514

[56] References Cited

U.S. PATENT DOCUMENTS

| D. 235,125 | 5/1975 | Schlachter | 220/85 CH |
| 2,131,663 | 9/1938 | Hughes | 220/94 A |
| 2,621,825 | 12/1952 | Lyon | 220/94 A |
| 2,781,938 | 2/1957 | Hampshire | 220/18 |
| 3,119,541 | 1/1964 | Lynn | 220/94 A |
| 3,323,677 | 6/1967 | Schraeger | 220/94 R |
| 3,503,535 | 3/1970 | Sparks | 220/85 CH |
| 3,526,138 | 9/1970 | Swett et al. | 206/514 |
| 3,610,461 | 10/1971 | Allyn | 220/94 R |
| 4,040,538 | 8/1977 | Gerson | 220/85 CH |
| 4,519,520 | 5/1985 | Hill | 220/85 CH |

FOREIGN PATENT DOCUMENTS

| 245219 | 6/1963 | Australia | 206/501 |
| 934277 | 5/1948 | France | 220/94 A |
| 182321 | 2/1936 | Switzerland | 220/85 CH |
| 801225 | 9/1958 | United Kingdom | 220/85 CH |

Primary Examiner—Stephen P. Garbe
Assistant Examiner—S. Castellano
Attorney, Agent, or Firm—Juettner Pyle & Lloyd

[57] ABSTRACT

A cooling utensil in the form of a container and a lid are provided with a releasable attachment to allow the cover to be hung from the container flush against the bottom of the container.

8 Claims, 2 Drawing Sheets

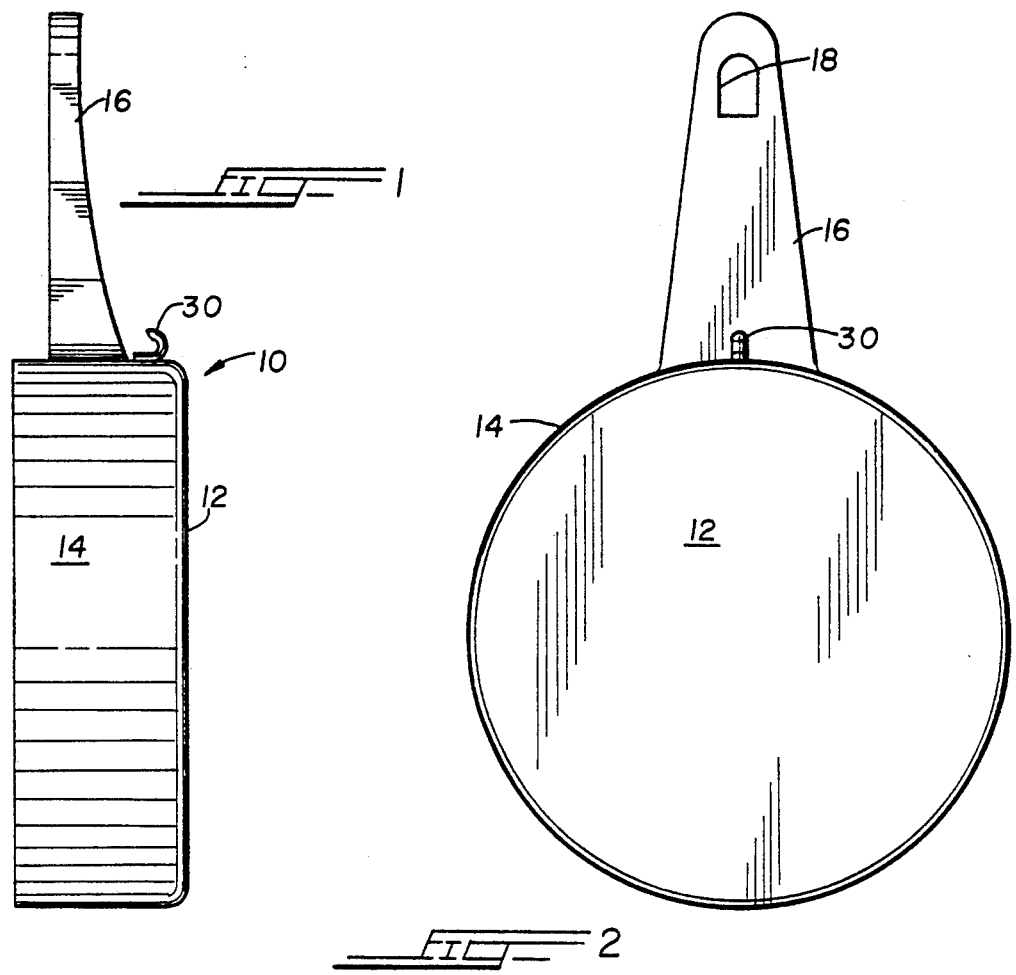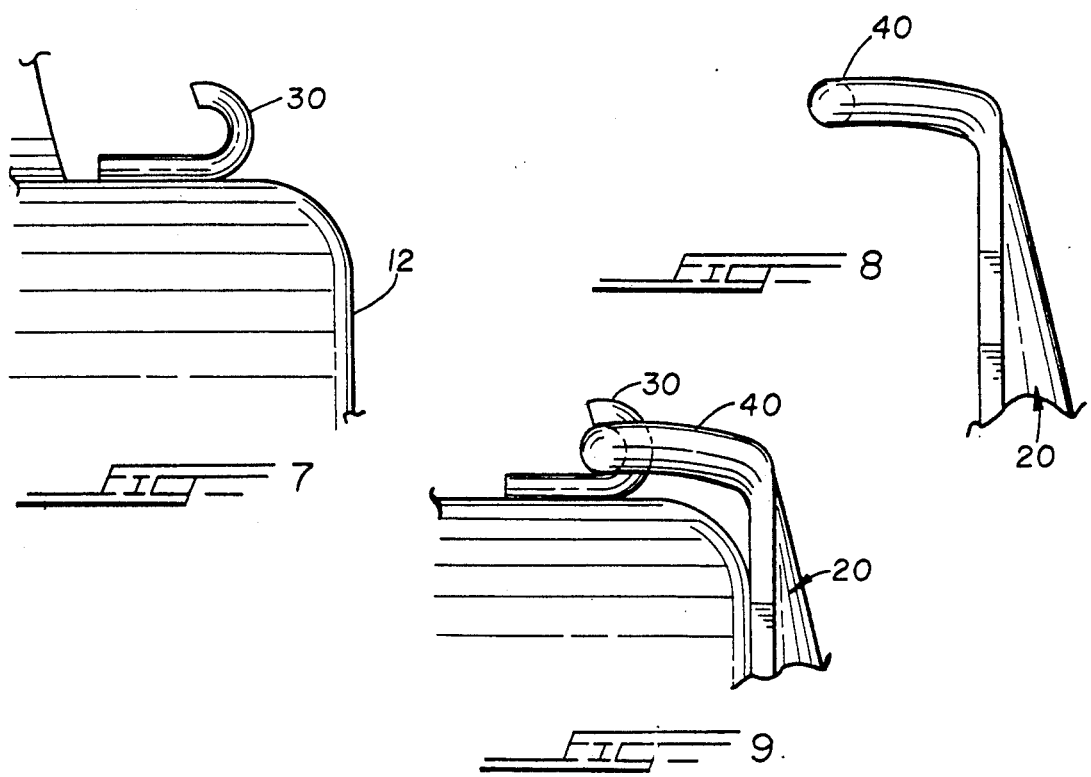

COOKING UTENSIL WITH NESTED LID

BACKGROUND OF THE INVENTION

This invention relates generally to lidded containers and more particularly to cooking utensils such as pots or pans having covers or lids which are customarily used together.

It is customary to store pots and pans either by hanging on the wall or in a stacked relationship. The covers or lids for such containers are usually stored in a cabinet separately and must be matched up with the appropriate container when placed in use. It would be desirable to provide a means to enable convenient storage or hanging of pots and pans together with their associated lids or covers.

SUMMARY OF THE INVENTION

A container and its associated cover are provided with releasable attachment means to enable the container and its cover to be stored or hung in a nested relationship. The container is provided with a conventional handle and has a J-shaped hook located beneath the handle. The cover has an eyelet extending from an edge thereof. The eyelet may be engaged over the hook, with the cover extending over the bottom of the container. This permits the hanging of the container by its handle on an upright support such as a wall, together with the associated cover.

THE DRAWINGS

FIG. 1 is a side view of a cooking container of the present invention.

FIG. 2 is a bottom view of the container shown in FIG. 1.

FIGS. 7, 8 and 9 are detailed views of the hook and eye attachment means of the present invention.

DESCRIPTION OF THE PREFERRED EMBODIMENT

The figures generally illustrate a container such as a cooking utensil in the form of a pot or pan, generally indicated at 10. Although such utensils may be provided in various forms, the version shown is conventional and includes a flat circular bottom 12 connected to an upstanding cylindrical side wall 14 having and open top, together with a handle 16 secured to and extending away from the wall in the usual fashion. The handle 16 may have a means near the end thereof to enable hanging of the utensil by the handle. In the embodiment shown, an opening 18 is provided near the end of the handle, although various types of hooks are well known and may be employed.

Figure 5:
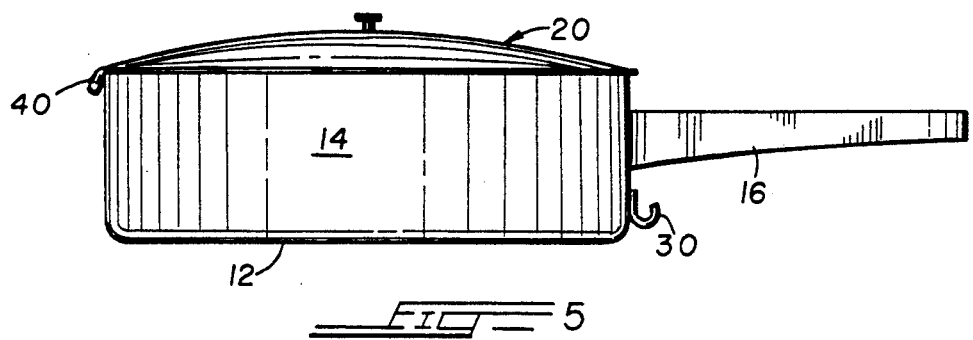
FIG. 5 is a side view of the container and cover, with the cover extending over the open top of the container.
Figure 3:
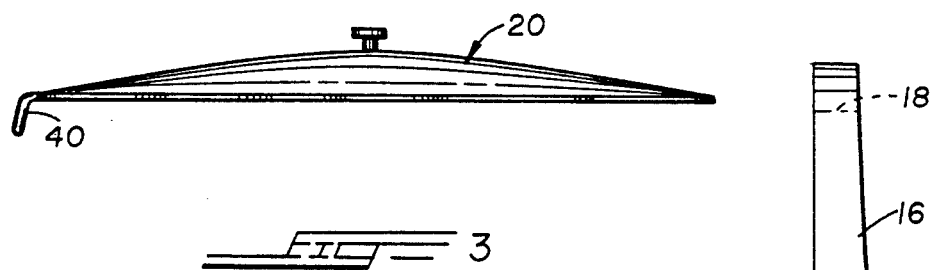
FIGS. 3 and 4 are side and underside views, respectively, of a cover used in conjunction with the container of FIGS. 1 and 2
Figure 4:
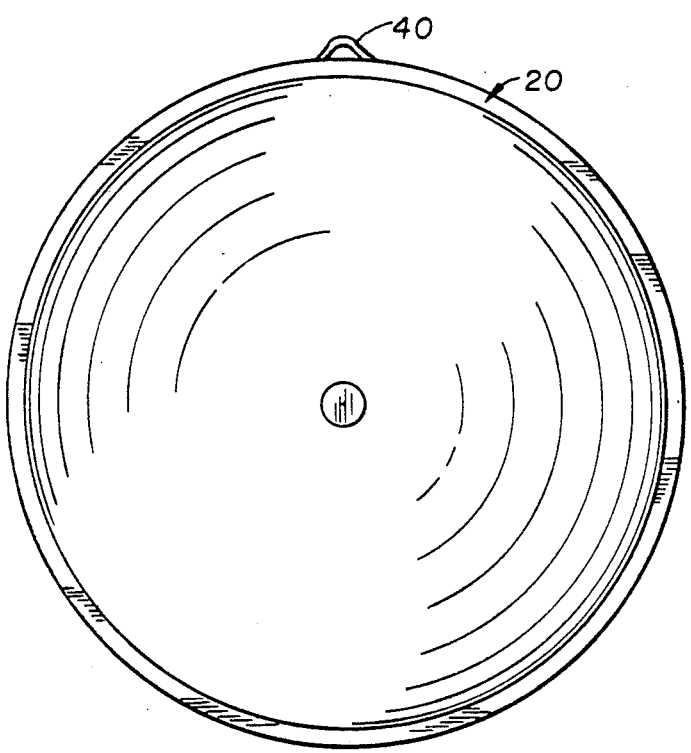

The cover 20 as shown in FIGS. 3 and 4 is of the conventional dome shape and is adapted to fit over the open top of the container as shown in FIG. 5.

The container 10 is provided with a hook 30 which is preferably secured to the side wall 14 at a location directly beneath or above the base of the handle 16. The base of the J-shaped hook is closely adjacent to, yet spaced from, the container bottom wall 12.

The cover 20 is provided with an eyelet 40 extending from an outer edge thereof. Preferably, the eyelet is in the form of a loop extending at an angle toward the interior of the cover.

Figure 6:
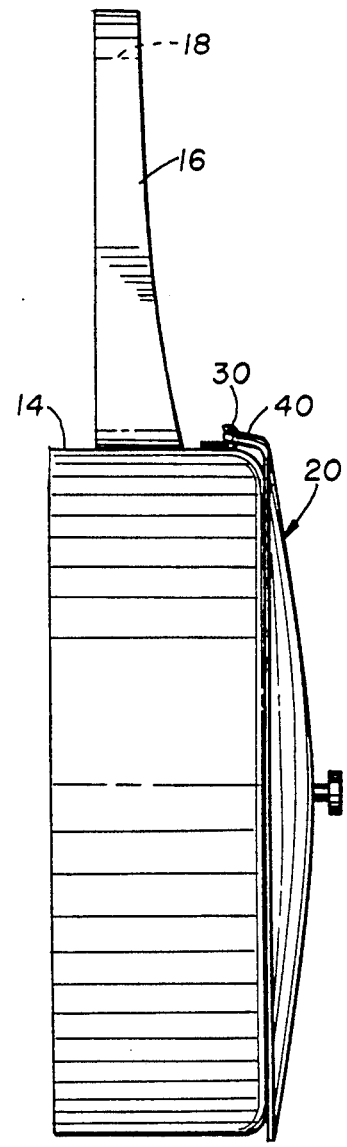
FIG. 6 is a side view of the container and cover in nested arrangement, with the hook and eye thereof in engagement.

FIG. 6 illustrates the container 10 and cover 20 in a nesting relation, with the hook 30 in engagement with the eyelet 40. It will be noted that the eyelet is arranged on an angle with respect to the base of the lid. This enables the lid 20 to hang from the hook with the base of the cover being disposed against the base of the container. In turn, the container and its associated cover may be hung together from an upright support such as a hook on a wall extending through the opening 18 in the handle.

The present invention offers the distinct advantage of enabling a cooking utensil to be stored with its associated cover in a compact relationship, and the cover and utensil may be hung or stored together as a unit.

It will be apparent that the hook and eyelet may be reversed and still achieve the same function. Also, the parts may be arranged to allow the cover to be releasably attached over the open top of the container, rather than the bottom. Other types of releasable attachment means may be employed, such as magnets, clips and tack like, as long as the attachment means can be configured to enable the cover to lay flat against the container.

I claim:

1. A cooking utensil comprising a container having a bottom portion and an open top portion, a cover adapted to removably extend over said open top portion of said container, and releasably engageable attachment means extending from respective parts of said container and cover for releasably hanging said cover from said container flat against one of said portions of said container, said releasably engageable attachment means comprising a hook extending from one of said parts of said container and cover and an eyelet extending from said other part of said container and cover, said hook being releasably engageable with said eyelet to enable hanging of said cover from said container and facilitating storage of the container and cover together.

2. The utensil of claim 1 wherein said one of said portions is the bottom portion of said container.

3. The utensil of claim 1 further comprising a handle joined to and extending outwardly from said container, and wherein said engageable attachment means for said container is located adjacent to and in alignment with said handle.

4. The utensil of claim 1 wherein said hook is secured to said container near the bottom portion thereof.

5. The utensil of claim 4 wherein said cover has a peripheral edge and wherein said eyelet extends from said peripheral edge.

6. The utensil of claim 5 wherein said eyelet is disposed on an angle with respect of said cover such that said hook and eyelet are engageable with said cover flat against the bottom portion of said container.

7. The utensil of claim 3 wherein said hook is located beneath the joiner of the handle with the container and is curved upwardly.

8. The utensil of claim 7 wherein means are provided for hanging of said container from its handle, with said cover hanging from said container.

* * * * *